US012677059B2

(12) United States Patent
Kapinos et al.

(10) Patent No.: US 12,677,059 B2
(45) Date of Patent: Jul. 7, 2026

(54) CAMERA DEVICE AND METHOD FOR PRECLUDING CAPTURE OF MANUAL DATA ENTRY IN IMAGE DATA

(71) Applicant: Lenovo (United States) Inc., Morrisville, NC (US)

(72) Inventors: Robert J Kapinos, Durham, NC (US); Igor Stolbikov, Apex, NC (US); Robert James Norton, Jr., Raleigh, NC (US); Scott Li, Cary, NC (US)

(73) Assignee: LENOVO (UNITED STATES) INC., Morrisville, NC (US)

( * ) Notice: Subject to any disclaimer, the term of this patent is extended or adjusted under 35 U.S.C. 154(b) by 79 days.

(21) Appl. No.: 18/917,726

(22) Filed: Oct. 16, 2024

(65) Prior Publication Data

US 2026/0107054 A1     Apr. 16, 2026

(51) Int. Cl.
| | |
|---|---|
| *H04N 23/611* | (2023.01) |
| *H04N 21/431* | (2011.01) |
| *H04N 23/617* | (2023.01) |
| *H04N 23/76* | (2023.01) |
| *H04N 23/88* | (2023.01) |

(52) U.S. Cl.
CPC ......... *H04N 23/611* (2023.01); *H04N 23/617* (2023.01); *H04N 21/4318* (2013.01); *H04N 23/76* (2023.01); *H04N 23/88* (2023.01)

(58) Field of Classification Search
CPC ........... H04N 23/61; H04N 23/611617; H04N 21/4318
See application file for complete search history.

(56) References Cited

U.S. PATENT DOCUMENTS

| | | | |
|---|---|---|---|
| 2019/0116364 A1* | 4/2019 | Dutt ..................... | H04N 19/124 |
| 2023/0108667 A1* | 4/2023 | Hassbring ............. | H04N 23/71 |
| | | | 348/143 |

* cited by examiner

*Primary Examiner* — Daniel M Pasiewicz
(74) *Attorney, Agent, or Firm* — Carroll, Hoette & Butscher, LLC; Christopher R. Carroll

(57) ABSTRACT

A camera device and method are described that perform object detection on sensor data generated by an image sensor to detect an input device within an environment outside of the camera device. The camera device and method analyze the sensor data to detect a hand of a user within the environment, and determine an impending use of the input device by the user based on a proximity of the hand to the input device and/or movement of the hand. Responsive to determining the impending use, the camera device and method generate an image data stream that includes altered image content within an area of interest that encompasses in the input device. The altered image content is not an accurate representation of the hand manipulating the input device in the environment, thereby precluding capture of manual data entry in the image data stream.

20 Claims, 4 Drawing Sheets

300

302

304

306

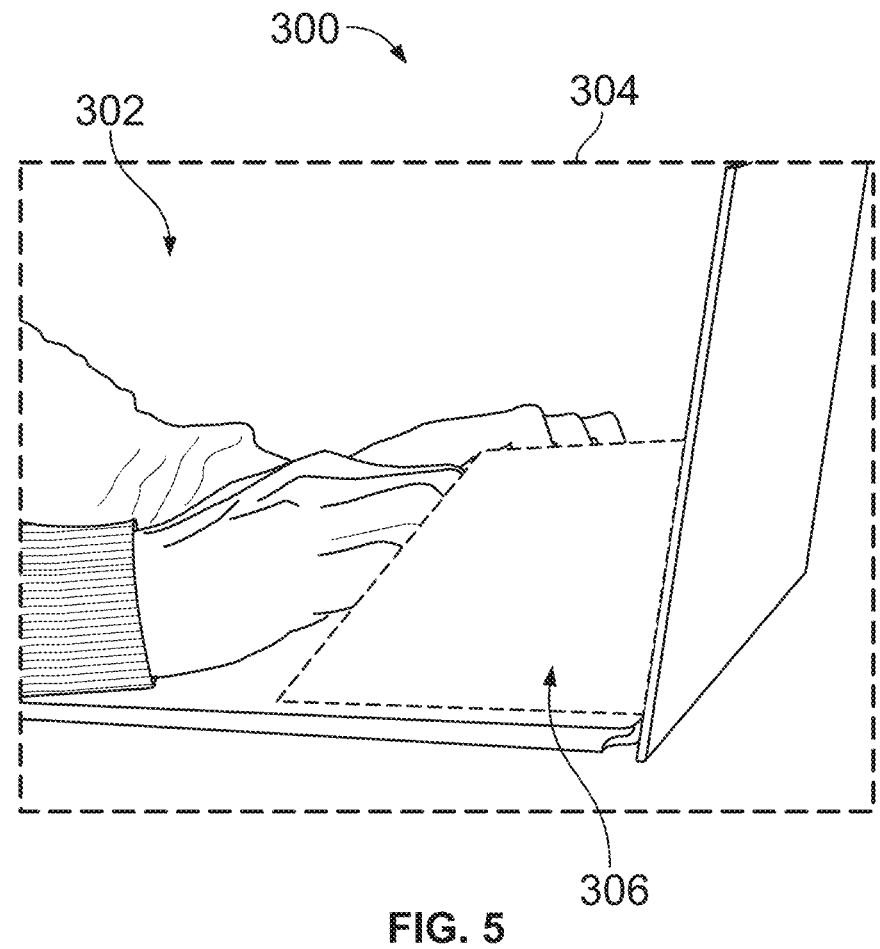
FIG. 5
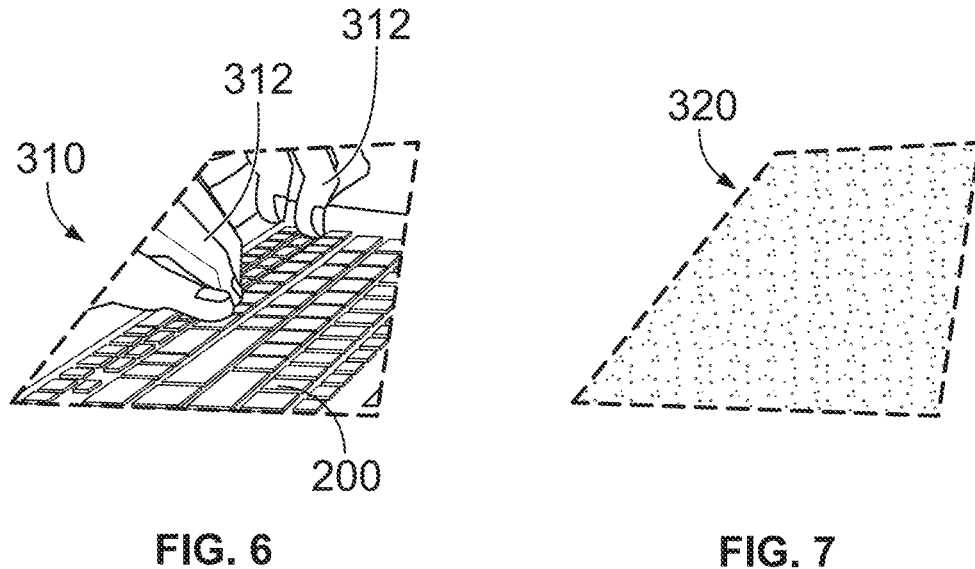
FIG. 6                              FIG. 7

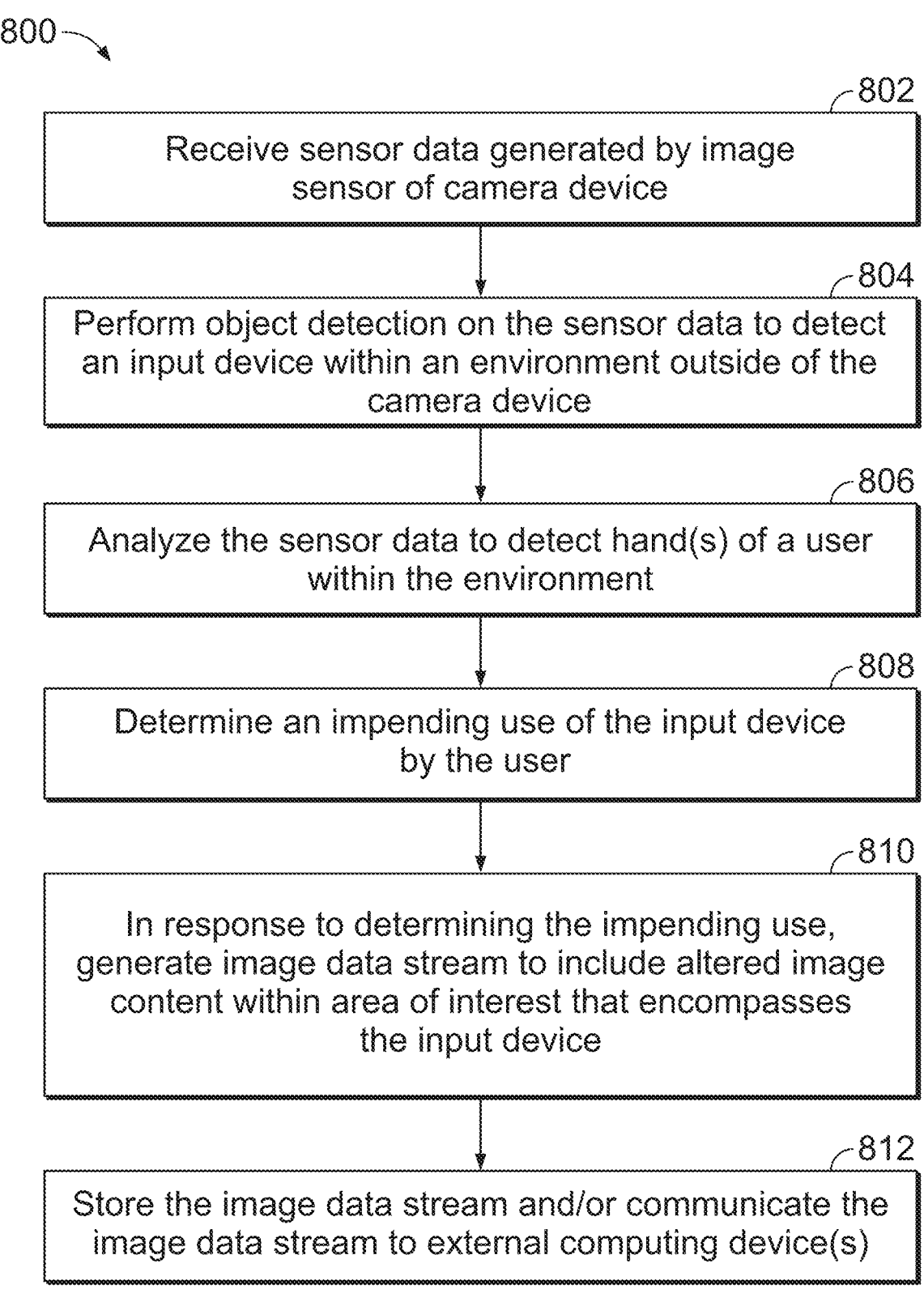

800

802
Receive sensor data generated by image
sensor of camera device

804
Perform object detection on the sensor data to detect
an input device within an environment outside of the
camera device

806
Analyze the sensor data to detect hand(s) of a user
within the environment

808
Determine an impending use of the input device
by the user

810
In response to determining the impending use,
generate image data stream to include altered image
content within area of interest that encompasses
the input device

812
Store the image data stream and/or communicate the
image data stream to external computing device(s)

FIG. 8

CAMERA DEVICE AND METHOD FOR PRECLUDING CAPTURE OF MANUAL DATA ENTRY IN IMAGE DATA

FIELD

The present disclosure generally relates to imaging devices and systems that generate image data depicting an environment based on captured light from the environment.

BACKGROUND

Cameras are prevalent and ubiquitous in modern society. Security cameras are installed within both the interior and exterior of buildings for surveillance purposes. Some security cameras are mounted in inconspicuous locations to reduce the likelihood of detection by people in and around the buildings. The inconspicuous placement may be for aesthetic reasons as well as to avoid influencing the behavior of the people that are within the field of view of the security cameras. Besides the cameras that are mounted in infrastructure for security and surveillance, cameras are prevalent as part of personal computing devices, such as laptops, tablet computers, and smartphones. Cameras can also be present in shelf- or table-mounted devices, such as conferencing hub devices, personal assistant devices, and/or the like.

As the video image quality and zoom capabilities of cameras improve, the likelihood increases of cameras unintentionally capturing private information of people. The private information can include data that is manually entered by a person (e.g., a user) into an input device. The input device can be a keyboard, a keypad, a touch pad of a computing device, a touch screen of a computing device, a stylus, and/or the like. The data that is manually entered may include passwords, personal identifying information, personal financial information, and/or the like. As an example, a person may press buttons on a keypad to lock and/or unlock the person's garage. As a matter of habit, the person may glance behind their back to make sure no one else is within eyesight of the keypad before entering the key code. But, a high resolution security camera nearby may be able to capture the sequence of buttons selected by the person. As a result, the person has unintentionally disclosed the key code to the person that has access to the high resolution security camera. In another example, a video conference hub camera within a meeting room may have a field of view that encompasses the keyboard of a presenter's personal computing device during a video conference meeting, depending on the relative positioning and orientation of the devices. If the presenter enters keystrokes into the keyboard to address an authentication mechanism while the hub camera records the presenter during the meeting, the private information embodied by the keystrokes may be available to all participants of the meeting as well as documented in the meeting recording. The unintentional disclosure of private information can be used against the victim, such as by selling private information, using the private information to gain unauthorized access, and/or using the private information to fraudulently impersonate the victim. Although people in modern society may have a general sense of being recorded when in public, people typically do not anticipate the privacy threat caused by cameras in the environment capturing manual data entry into input devices.

A need remains for a camera device and method that can preclude capturing manual data entry in image data, and thereby proactively avoid the risk of imaging private information manually entered into an input device.

SUMMARY

In accordance with an example or aspect, a camera device is provided that includes an image sensor, a memory, and one or more processors operably connected to the memory. The image sensor is configured to capture light propagating through a lens from an environment outside of the camera device and generate sensor data representing the environment. The memory is configured to store program instructions. The program instructions are executable by the one or more processors to perform object detection on the sensor data to detect an input device within the environment that is configured to be manually manipulated to provide an input signal. The program instructions are executable by the one or more processors to analyze the sensor data to detect at least one hand of a user within the environment, and determine an impending use of the input device by the user based on at least one of a proximity of the hand to the input device or movement of the hand. In response to determining the impending use, the program instructions are executable by the one or more processors to generate an image data stream that includes altered image content within an area of interest (AOI) of a field of the image data stream. The AOI encompasses the input device. The altered image content is not an accurate representation of the hand manipulating the input device in the environment, so the image data stream lacks capture of data entry by the user into the input device.

The program instructions may be executable by the one or more processors to (i) store the image data stream on the memory and/or (ii) communicate the image data stream to an external computing device. The one or more processors may directly receive the sensor data from the image sensor. The program instructions may be executable by the one or more processors to generate the image data stream to include the altered image content within the AOI and accurate image content within a remainder of the field of the image data stream. The one or more processors may generate the accurate image content by performing at least one of lighting balance or color correction on the sensor data. In response to determining that use of the input device by the user is not impending, the program instructions may be executable by the one or more processors to generate the image data stream based on the sensor data so that the image data stream lacks the altered image content.

In an example, the program instructions may be executable by the one or more processors to determine one or more measured vectors based on the movement of the hand. The one or more processors may determine the impending use of the input device by the user by comparing the one or more measured vectors to stored vectors in a gesture database. The program instructions may be executable by the one or more processors to perform the object detection on the sensor data to detect at least one of a keyboard, a keypad, a touch screen, a touch pad, or a stylus. The program instructions may be executable by the one or more processors to receive the sensor data as a sequence of sensor data frames generated by the image sensor over time. The program instructions may be executable by the one or more processors to analyze multiple sensor data frames in the sequence to determine the impending use of the input device by the user based on the proximity of the hand to the input device and/or the movement of the hand. The program instructions may be executable by the one or more processors to determine the impending use of the input device based on both the proximity of the hand to the input device and the movement of the hand. The program instructions may be executable by the one or more processors to determine the impending use of the input device based also on an orientation of fingers of the hand depicted in the sensor data.

The one or more processors may include an image signal processor (ISP). The one or more processors may include a machine learning (ML) algorithm that receives the sensor data as an input. The ML algorithm may be trained to detect the hand of the user within the environment and analyze the movement of the hand relative to the input device based on the input. The ML algorithm may output a value indicating a likelihood of the impending use of the input device by the user. The camera device may include a housing that surrounds and contains the image sensor, the memory, and the one or more processors. The lens may be mounted to the housing.

In an example, the program instructions may be executable by the one or more processors to generate the image data stream by blurring the AOI as the altered image content. In another example, the program instructions may be executable by the one or more processors to generate the image data stream by incorporating a still image in the AOI as the altered image content. The still image may depict: (i) the hand of the user, (ii) a stock hand of a generic user, and/or (iii) the input device. In another example, the program instructions may be executable by the one or more processors to generate the image data stream by generating, as the altered image content in the AOI, an inaccurate reconstruction of the movement of the hand relative to the input device. A position of one or more fingers of the hand relative to the input device in the inaccurate reconstruction may differ from an actual position of the one or more fingers relative to the input device in the environment.

In accordance with an example or aspect, a method is provided for precluding capture of manual data entry in image data. The method includes receiving sensor data generated by an image sensor of a camera device and representing an environment outside of the camera device. The image sensor is configured to generate the sensor data based on capturing light propagating through a lens of the camera device from the environment. The method includes performing object detection on the sensor data to detect an input device within the environment that is configured to be manually manipulated to provide an input signal. The method includes analyzing the sensor data to detect at least one hand of a user within the environment, and determining an impending use of the input device by the user based on at least one of a proximity of the hand to the input device or movement of the hand. In response to determining the impending use, the method includes generating an image data stream that includes altered image content within an area of interest (AOI) of a field of the image data stream. The AOI encompasses the input device. The altered image content is not an accurate representation of the hand relative to the input device in the environment, so the image data stream lacks capture of data entry by the user into the input device.

The method may include (i) storing the image data stream on a memory of the camera device and/or (ii) communicating the image data stream to an external computing device.

In accordance with an example or aspect, a computer program product is provided that includes a non-transitory computer readable storage medium. The non-transitory computer readable storage medium includes computer executable code configured to be executed by one or more processors to receive sensor data generated by an image sensor of a camera device and representing an environment outside of the camera device. The image sensor is configured to generate the sensor data based on capturing light propagating through a lens of the camera device from the environment. The computer executable code is configured to be executed by the one or more processors to perform object detection on the sensor data to detect an input device within the environment that is configured to be manually manipulated to provide an input signal. The computer executable code is configured to be executed by the one or more processors to analyze the sensor data to detect at least one hand of a user within the environment, and to determine an impending use of the input device by the user based on at least one of a proximity of the hand to the input device or movement of the hand. Responsive to determining the impending use, the computer executable code is configured to be executed by the one or more processors to generate an image data stream that includes altered image content within an area of interest (AOI) of a field of the image data stream. The AOI encompasses the input device. The altered image content is not an accurate representation of the hand relative to the input device in the environment, so the image data stream lacks capture of data entry by the user into the input device.

BRIEF DESCRIPTION OF THE DRAWINGS

FIG. 5 shows an incomplete frame of an image data stream depicting the scene shown in FIG. 2.

FIG. 6 shows a still image that represents one example of altered image data that can be incorporated into an image data stream that is generated.

FIG. 7 shows a blur effect that represents a second example of altered image data that can be incorporated into the generated image data stream.

FIG. 8 is a flow chart of a method for precluding capture of manual data entry in image data, according to an embodiment.

DETAILED DESCRIPTION

Figure 1:
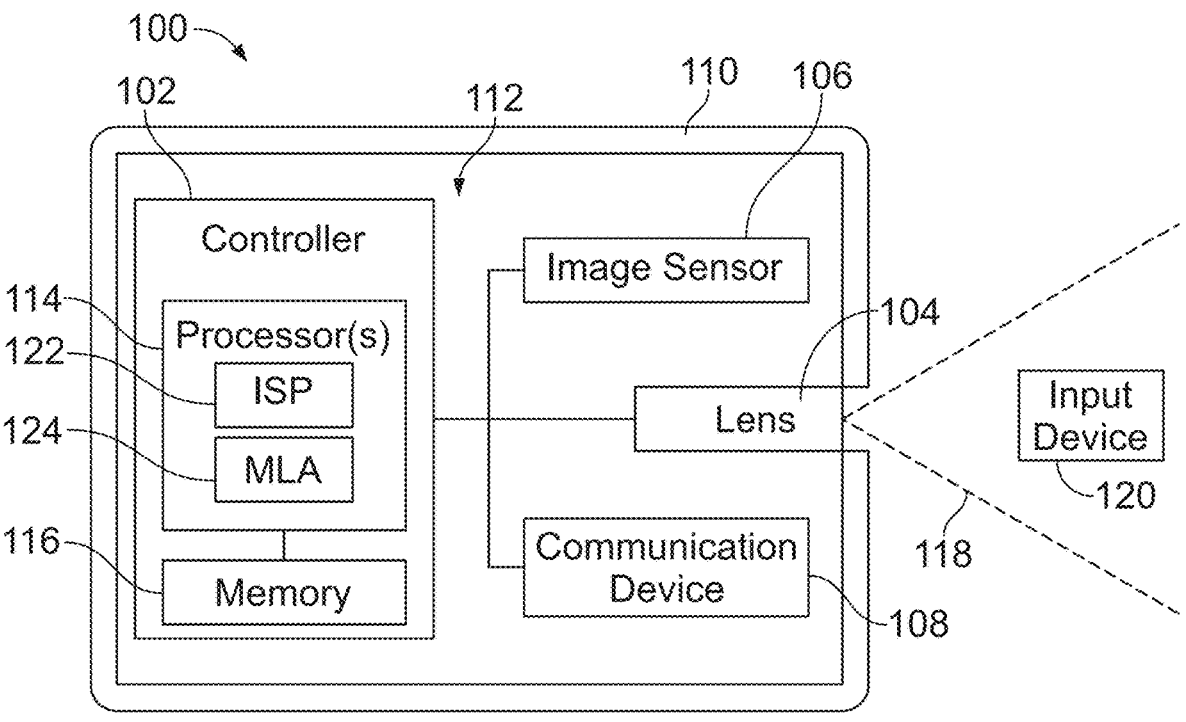
FIG. 1 is a block diagram of a camera device according to an embodiment.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

References herein to "computer device" and "computing device," unless specified, shall mean any of various types of hardware devices that perform processing operations, such as servers, computer workstations, personal computers, and the like. The personal computers may include laptop (e.g., notebook) computers, desktop computers, tablet computers, smartphones, wearable computers (e.g., smartwatches), and the like.

References herein to "machine learning" shall mean artificial intelligence (AI) algorithms that learn from various automatic or manual feedback, such as observations and/or data. The AI algorithms may be adjusted over multiple iterations based on the observations and/or data. For example, the AI algorithms may be adjusted by supervised learning, unsupervised learning, and/or reinforcement learning (e.g., customer feedback). Non-limiting examples of AI algorithms include decision trees, K-means, deep learning, artificial neural networks, and/or the like.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The camera device and method described herein proactively preclude generating image data depicting manual data entry into an input device that is within a field of view of the camera device. As a direct consequence, the camera device and method avoid generating image data that could reveal private information of the user (e.g., person) that performed the manual data entry. For example, the camera device and method described herein detect the presence of an input device and at least a hand of a user within the field of view. The camera device and method then determine whether the user is about to use the input device, such as by pressing physical or virtual buttons on the input device. If an impending use of the input device is positively determined, the camera device and method generate an image data stream that includes altered image content within an area of interest that encompasses the input device. The altered image content takes the place of keystrokes or other movements of the user's hand manipulating the input device in the image data stream that is output from the camera device. The altered image content may be a still image, a blur effect, or an (intentionally) inaccurate reconstruction of the movements of the user's hand relative to the input device. The altered image content intentionally conceals or misrepresents the actual movement of the user's hand(s) relative to the input device in the environment outside of the camera device. As a result, the image data stream fails to capture the actual manual data entry provided by the user on the input device.

The embodiments described herein improve the functionality of computers and solve technical problems. As an example, the embodiments described herein solve the problem of unintentional disclosure of private information via camera-based capture of keystrokes and other manual data entry on an input device. In the embodiments described herein, even if a user enters a password into a keypad that is clearly within the field of view of the camera device, the image data stream that is generated is devoid of any image content depicting the actual keystrokes of the user relative to the input device. The technical effect is that the camera device and method described herein maintains the confidentiality of the information manually entered into input devices. For example, there is no security concern about a bad actor gaining access to the image data stream generated by the camera device because there is no manual data entry-based private information of the user present in the image data stream.

In various examples described herein, the operations are performed on raw sensor data generated by an image sensor within the camera device. The raw sensor data is not in a form that is visible to humans. For example, the raw sensor data may have incorrect color composition and may be in a custom color space. The actual keystrokes of the user on the input device may be depicted in the raw sensor data, but the raw sensor data is not preserved. For example, the raw sensor data is not stored locally within the camera device and is not communicated remotely from the camera device. The raw sensor data may only be used by the controller of the camera device to perform the operations described herein to generate the image data stream. As a result, the camera device does not generate any visible image data depicting the user's actual data entry on the input device. The camera device and method described herein may not have the capability to leak private information manually entered into an input device within the field of view.

The camera device and method may improve the functioning of computers by performing the analysis and mitigation operations described herein as pre-processing operations based on the raw sensor data directly received from the image sensor. The operations are performed before any visible image data is generated and fixed in a tangible form. The camera device and method do not simply analyze a visible image stream during post-processing, and then conceal portions of the image stream that are determined to potentially disclose private information. The drawback of this alternative example is that the initial visible image stream may contain private information, representing a security risk. For example, a hacker could access the initial, unmodified visible image stream while it is stored in a data storage device, transmitted to another device, and/or the like. The camera device and method described herein has no similar security risk because no visible image data is formed that accurately shows the user's keystrokes.

FIG. 1 is a block diagram of a camera device 100 according to an embodiment. The camera device 100 includes a controller 102 that performs some or all of the sensor data analysis and image generation operations described herein. The camera device 100 also includes a lens 104 and an image sensor 106. The camera device 100 may include a communication device 108. The components of the camera device 100 may be communicatively connected to each other via wired and/or wireless communication links to permit the transmission of information in the form of signals. In an example, the components of the camera device 100 shown in FIG. 1 are located within, or mounted to, a housing 110. For example, the image sensor 106 and the controller 102 may be contained within an interior cavity 112 of the housing 110. The lens 104 may be mounted to the housing 110 within an opening of the housing 110 to allow the lens 104 to receive light from the environment outside of the housing 110.

The camera device 100 may have additional components mounted in or on the housing 110 that are not shown in FIG. 1. The additional components may include a power source and circuitry, such as a battery, an inverter, a power cable, and/or the like. The additional components may include a display panel and/or a user interface for interacting with the camera device 100. The user interface may include buttons for controlling the camera device 100.

The camera device 100 may be a digital camera. The camera device 100 described herein can have various applications. For example, the elements and operations of the camera device 100 described herein can be implemented in various different types of cameras. For example, the camera device 100 may be an infrastructure camera that is mounted on a building, within a building, on a pole (e.g., a light or telephone pole), or the like. Infrastructure cameras can be used to provide surveillance for security purposes. The camera device 100 in another example may be part of a portable device that can be mounted on a shelf, table, desk, or the like. Example portable devices can include hub devices for videoconferencing, laptop computers, personal assistant devices, and/or the like. In still other examples, the camera device 100 described herein may be integrated into other types of computing devices, such as desktop computers, smartphones, and/or the like.

The controller 102 represents hardware circuitry that includes and/or is connected with one or more processors 114 (e.g., one or more microprocessors, integrated circuits, microcontrollers, field programmable gate arrays, etc.). The controller 102 includes and/or is connected with a tangible and non-transitory computer-readable data storage medium (e.g., device), referred to herein as memory 116.

The memory 116 may store programmed instructions (e.g., software) that are executed by the one or more processors 114 to perform the sensor data analysis and image generation operations described herein. For example, the programmed instructions may be utilized by the one or more processors 114 to receive sensor data generated by the image sensor 106 and representing the environment outside of the camera device 100. The programmed instructions may be utilized by the one or more processors 114 to perform object detection on the sensor data to detect an input device 120 within the environment, and to analyze the sensor data to detect at least one hand of a user within the environment. The programmed instructions may be utilized by the one or more processors 114 to determine an impending use of the input device 120 by the user based on a proximity of the hand to the input device 120 and/or movement of the hand. In response to determining the impending use, the programmed instructions may be utilized by the one or more processors 114 to generate an image data stream. The image data stream includes altered image content within an area of interest (AOI) of a field of the image data stream. The AOI encompasses the input device. The altered image content is not an accurate representation of the hand relative to the input device 120 in the environment, so the image data stream lacks capture of data entry by the user into the input device 120.

The image sensor 106 captures light propagating through the lens 104 from the environment. The image sensor 106 is an optical sensor that generates sensor data based on the captured light through the lens 104. The light captured by the image sensor 106 may be reflected off objects in the real world. The environment refers to the space in the real world outside of the camera device 100 (e.g., outside of the housing 110). The camera device 100 captures light from the environment, within a field of view 118 of the camera device 100, to generate image data depicting a scene in the environment. The sensor data generated by the image sensor 106 may be referred to as raw image data. For example, the sensor data may be a bit stream in a custom color space with a set resolution of pixels. The sensor data may have multiple different planes of pixels. The sensor data may not be in a format that is visible to humans. For example, the sensor data may not have a correct color composition for viewing.

The one or more processors 114 analyze the sensor data generated by the image sensor 106. The processor(s) 114 may perform the analysis operations described herein on the raw image data from the image sensor 106 before an image data stream is generated. As such, the processor(s) 114 perform pre-processing on the sensor data. The processor(s) 114 may generate an image data stream in a format that is human visible only after performing the analysis operations described herein. For example, the processor(s) 114 may perform the analysis and determine whether altered image content is necessary before transforming the sensor data (e.g., the raw image data) into an image data stream for storage and/or export. The image data stream may be an image data stream that includes altered image content to conceal manual data entry on the input device 120 in the imaged environment. The image data stream may have a high image quality and/or resolution. For example, the processor(s) 114 may generate the image data stream by performing lighting balance, color correction, and/or the like on the sensor data. The processor(s) 114 may fine-tune the image brightness of the stream based on the light that reaches the image sensor 106.

In an example, the processor(s) 114 receive the sensor data directly from the image sensor 106. For example, the sensor data may be transmitted along a conductive wire or signal trace from the image sensor 106 to the processor(s) 114, without first being stored in the memory 116 or transmitted to another component or device. In an example, the processor(s) 114 include or represent an integrated image signal processor (ISP) 122. The ISP 122 may perform at least some of the operations of the processor(s) 114 described herein.

In an example, the processor(s) 114 include or are communicatively connected to a machine learning algorithm (MLA) 124. The MLA 124 may be used to analyze the sensor data and perform at least some of the operations of the processor(s) 114 described herein. For example, the MLA 124 may be used in conjunction with the ISP 122. In an example, the MLA 124 may analyze the sensor data to determine if there is an impending use of an input device within the environment by a user, and to select and position altered image content if the impending use is affirmed. The ISP 122 may receive the output of the MLA 124 and generate the image data stream based on the sensor data and the output of the MLA 124. For example, the ISP 122 may perform color correction and lighting balance to transform the sensor data to image data, and may incorporate the altered image content into the image data to generate the image data stream.

The MLA 124 may be trained to perform object detection, gesture analysis, and/or altered image content selection. The MLA 124 may receive the sensor data generated by the image sensor 106 as an input. The MLA 124 may be trained to perform object detection on the sensor data to detect an input device (e.g., the input device 120) present in the environment. The MLA 124 may also use object detection to detect at least one hand of a user present in the environment. The MLA 124 may track movement of the user's hand and may perform gesture analysis to predict whether or not the user is about to perform manual data entry on the detected input device. The MLA 124 may output a value indicating the likelihood of the impending use. The processor(s) 114 may use the output of the MLA 124 (e.g., the value) to determine whether or not to incorporate altered image content into the image data stream that is generated by the processor(s) 114 (e.g., the ISP 122). The MLA 124 may be integrated with the processor(s) 114 in the example shown in FIG. 1, but the MLA 124 may be discrete from the processor (s) 114 and stored in the memory 116 in another example.

The communication device 108 represents hardware circuitry that can communicate electrical signals via wireless communication pathways and/or wired conductive pathways. The controller 102 may control the communication device 108 to remotely communicate the image data stream that is generated by the processor(s) 114. For example, the communication device 108 may be used to transmit the image data stream (e.g., the image data stream that includes altered image content) through a network from the camera device 100 to remote computing devices. The remote computing devices may be servers, personal computing devices, other camera devices, and/or the like. The network may be the Internet, a local area network (LAN), or the like. The components in the network may be communicatively connected to each other via wired and/or wireless communication links to permit the transmission of information in the form of signals. If the camera device 100 is used to capture image content of a first participant in a video conference call, the communication device 108 may transmit the generated image data stream to a server of a company that hosts the video conference call and/or to personal computing devices of other participants in the video conference call. In an example, the communication device 108 may include transceiving circuitry, one or more antennas, and the like for wireless communication capability. The communication device 108 may communicate with a cellular tower, a modem, a router, and/or the like.

The controller 102 analyzes the sensor data to detect one or more input devices located within the environment in the field of view of the camera device 100. FIG. 1 shows a single input device 120. The controller 102 may search the sensor data for input devices that are devices designed to be manually manipulated by a user's hands to provide an input signal. For example, the controller 102 may search for input devices that include physical buttons or keys, such as keyboards and keypads. The controller 102 may search for input devices that can display virtual buttons or keys, such as touch panels, touch screens, and touchpads. The controller 102 may search for input devices such as styluses that are designed to be handheld and moved to interact with a computing device. The input devices sought by the controller 102 may be components of larger devices, such as computers (e.g., work stations, desktop computers, laptop computers, tablet computers, smartphones, smartwatches, and/or the like), locksets, alarm systems, and/or the like. In an example, the controller 102 may only search for non-biometric-type input devices. The controller 102 may ignore or fail to detect biometric devices that perform fingerprint analysis, lip-reading, or the like. A user may use the input device 120 to generate user input selections. For example, a user may type on a keyboard, as the input device 120, to provide manual data entry into a computing device. Some of the information that the user enters into the input device 120 may be private information. Private information referred to herein includes information that the user does not want to make publicly available. Example private information can include passwords, financial information (e.g., credit card number, debit card number, etc.), and personal identification information (e.g., user name, employee ID number, personal information number (PIN), social security number, answer to a security question, etc.). The user may enter the private information into the input device 120 to gain physical or virtual access to a restricted area.

In an example, the controller 102 may continuously perform the sensor data analysis and image generation operations described herein while the camera device 100 is actively operating. In another example, the sensor data analysis and image generation operations may be selectively activated by a user, independent of general image generation operations, by selecting a physical button on the camera device 100 or selecting a virtual button on a user interface presented on a display device. The display device may be part of the camera device hardware or part of an external computing device that connects to the camera device 100 via a network connection.

Upon receipt of the sensor data generated by the image sensor 106, the processor(s) 114 performing the sensor data analysis operation analyze the sensor data in an attempt to detect at least one input device 120 within the environment. The processor(s) 114 may perform an object detection algorithm to search for the input device 120. Depending on the environment, the object detection may positively detect multiple input devices 120 within the imaged field of view. Furthermore, the object detection may detect zero input devices 120 in the input sensor data frame or frames analyzed. In an example, the processor(s) 114 receive the sensor data and analyze the sensor data in near real time as the sensor data is generated by the image sensor 106. In various example, the object detection to detect the input device 120 may be performed by the ISP 122 or the MLA 124. As an example, the MLA 124 may be trained to detect various known types of input devices, such as keyboards, keypads, touchscreen, touchpads, styluses, and/or the like.

The processor(s) 114 also analyze the sensor data to detect at least one hand of a user within the environment and within the field of view of the camera device 100. The processor(s) 114 may perform an object detection algorithm to search for the hand or hands. Depending on the environment and the time period, the object detection may detect zero hands, only one hand, or multiple hands within the imaged field of view. In an example, the processor(s) 114 may perform a first object detection algorithm to detect the input device(s) 120, and a second object detection algorithm to detect the hand (s). The processor(s) 114 may only perform the second object detection algorithm if at least one input device 120 is detected in the field of view. In another example, the processor(s) 114 may perform a single object detection algorithm to search for both input devices and hands. For example, the MLA algorithm 124 may be trained to identify both input devices and hands in the input sensor data as items of interest.

Figure 2:
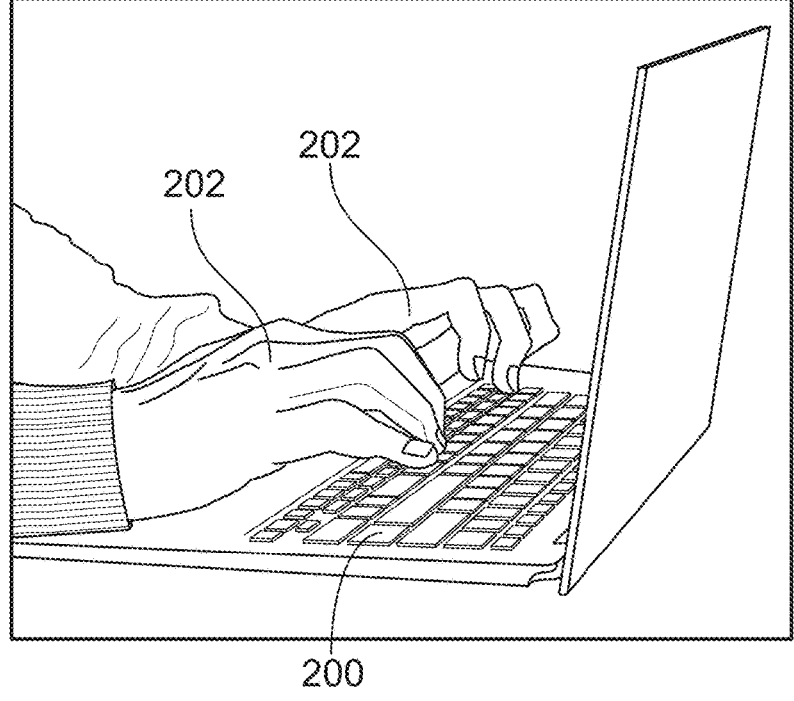
FIG. 2 represents a first example scene in an environment within a field of view of the camera device.
Figure 3:
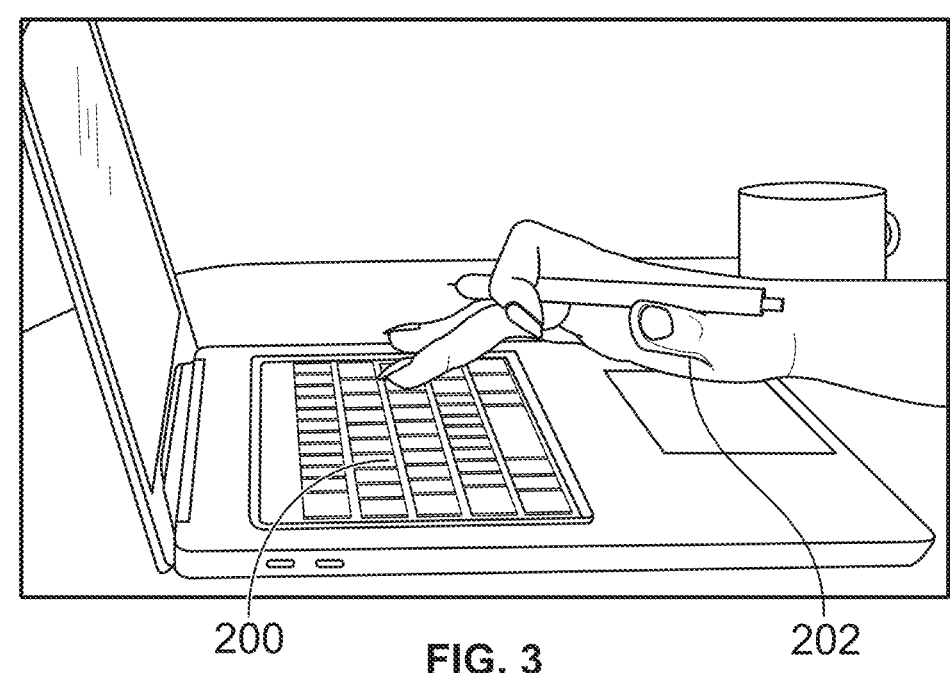
FIG. 3 represents a second example scene in the environment within the field of view of the camera device.
Figure 4:
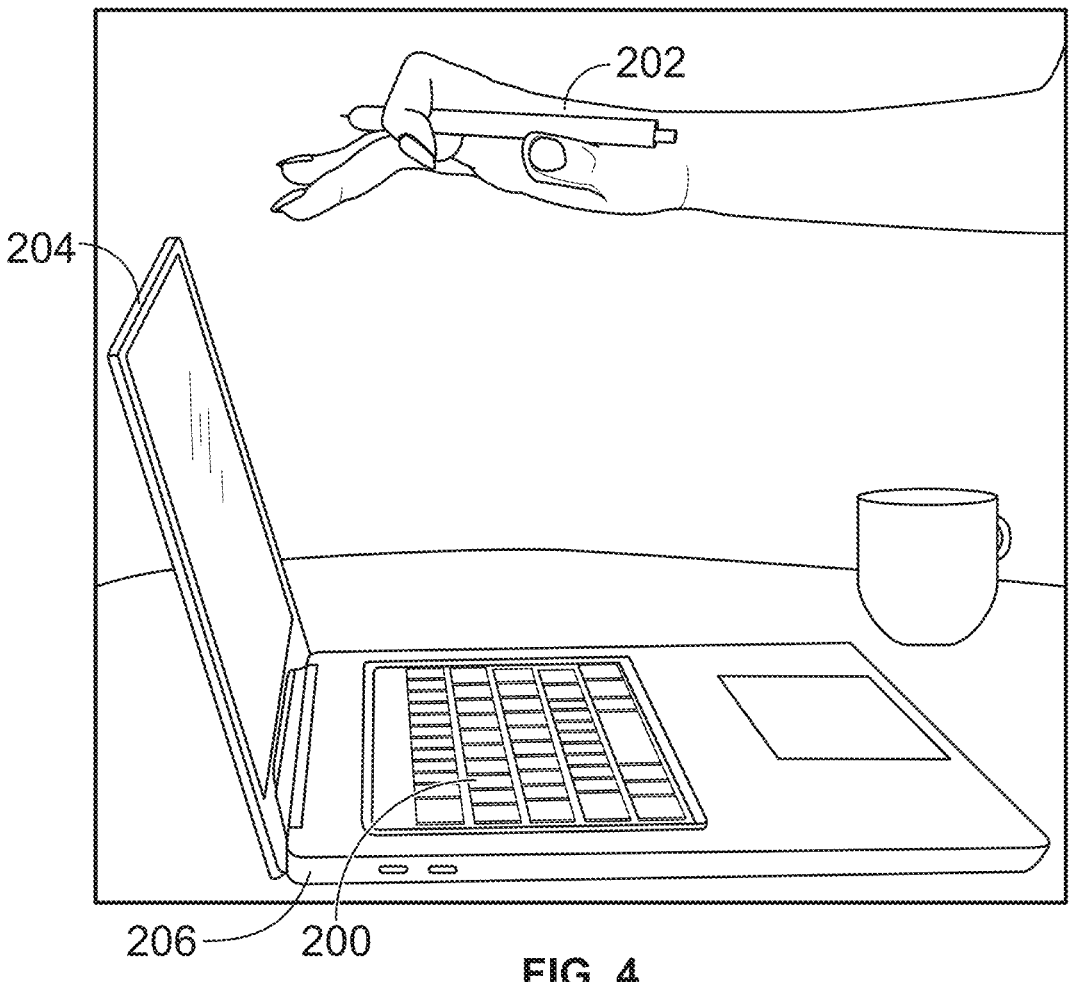
FIG. 4 represents a third example scene in the environment within the field of view of the camera device.

FIGS. 2 through 4 represent three example scenes in the environment that may be within the field of view of the camera device 100. These three example scenes in FIGS. 2 through 4 represent actual activity in the real world (e.g., ground truth scenarios) that is captured by the camera device 100, but not image data generated by the camera device 100. For example, FIGS. 2 through 4 are not images generated by the camera device 100. In each of the scenes, the processors (s) 114 may receive sensor data generated by the image sensor 106. The processor(s) 114 may perform object detection to detect a keyboard 200 as an input device and at least one hand 202 of the user. The keyboard 200 in each of the three scenes is part of a laptop computer. Only one hand 202 of the user is visible in FIGS. 3 and 4, but both hands 202 of the user are visible in FIG. 2. The processor(s) 114 detect both hands 202 in FIG. 2.

In each scene, after detecting the input device and the hand(s), the processor(s) 114 determine an impending use of the input device by the user based on a proximity of the hand(s) to the input device and/or movement of the hand(s). In a first example, the processor(s) 114 may determine the impending use based on the proximity of the hand(s) to the input device. In a second example, the processor(s) 114 may determine the impending use based on the movement of the hand(s), such as movement relative to the input device. In a third example, the processor(s) 114 may determine the impending use based on both the proximity of the hand(s) to the input device and the movement of the hand(s).

The movement may refer to tracked changes in position of the hand(s) over time as detected in different frames of the sensor data. For example, the processor(s) 114 may receive the sensor data as a sequence of sensor data frames generated by the image sensor over time. The processor(s) 114 may analyze multiple sensor data frames in the sequence to determine the movement of the hand(s) relative to the input device. Furthermore, the processor(s) 114 may recalculate the proximity of the hand(s) to the input device over time as the hand(s) move. In an example, after detecting the input device and the hand(s) in the field of view based on a first (e.g., reference) sensor data frame, the processor(s) may analyze a series of sensor data frames following the reference sensor data frame on which the object detection was performed. The series may be any number of sensor data frames, such as from three to eight sensor data frames. The processor(s) 114 may analyze the following series of sensor data frames for tracking the movement and positioning of the hand(s).

Optionally, the processor(s) 114 may not perform object detection on every frame of the sensor data. The processor(s) 114 may perform objection detection at set intervals. For example, after performing object detection on a first frame, the processor(s) 114 may simply track movement of the hands on the second through eighth frames, and then may perform object detection on the ninth frame of sensor data in the sequence. This process may improve efficiency by allowing the processor(s) 114 to not perform object detection on every frame of the sensor data. If no hands are detected in the first frame of the sensor data, then the processor(s) 114 may not analyze the following series of frames. In that case, the processor(s) 114 may be dormant and then perform object detection again in the next cycle, such as on the ninth frame in the sequence.

The impending use refers to the hand(s) of the user being poised to use the input device so that it is reasonable to predict that the input device is about to be used by the user. The user may use the input device to provide a manual data entry by, for example, pressing keys or buttons, tapping or dragging at least one finger along a touch-sensitive surface of a touch screen or touch pad, tapping or dragging a stylus along a surface of a stylus-sensitive panel of a computing device, of the like. In an example, the processor(s) 114 determine the impending use of the input device before the user actually uses the input device, and therefore prior to any manual data entry. In the illustrated examples in FIGS. 2 through 4, the processor(s) 114 may detect the impending use, if present, prior to the hand(s) 200 actually touching the keyboards 202 or prior to the fingers of the hand(s) 200 actually pressing any of the keys of the keyboards 202. As a result, the processor(s) 114 may determine the impending use before the user enters any information using the keyboard 202, which enables the processor(s) 114 to preemptively mitigate by precluding to capture the manual data entry in image data.

If the user actually inputs private information using the keyboard 202, the keystrokes of the user's fingers on the keyboard 202 are intentionally not captured in the image data stream generated by camera device 100. For example, when generating the image data stream based on the sensor data, the processor(s) 114 incorporate altered image content in an area of the image data stream that would otherwise show the keystrokes. Rather than showing the keystrokes, the image data stream shows the altered image content, which protects the privacy and confidentiality of the user's manual data entry into the input device. In embodiments, the processor(s) 114 do not record or analyze the manual data entry (e.g., the actual keystrokes, taps, presses, etc.) of the user on the input device. The processor(s) 114 do not make any determination about actual use of the input device by the user. Rather, the processor(s) 114 determine whether or not use of the input device is impending. If impending use is detected, then the mitigation is triggered and the altered image content is used to generate the image data stream. If impending use is not detected, then the processor(s) 114 use the sensor data to generate the image data stream, as is conventionally done, without incorporating altered image content into the stream.

In an example, the processor(s) 114 may determine the impending use based on the proximity of the user's hand(s) to the input device by using the sensor date to measure or estimate a distance from the hand(s), or fingers thereof, to the input device. For example, in the illustrated scenes in FIGS. 2 and 3, the user's fingers are hovering only a few centimeters above the keys of the keyboards 200. Furthermore, the fingers are positioned directly above the keys, so simply lowering the hand or a finger thereof could press a key. The processor(s) 114 may measure the shortest distance between the fingertips of the hand(s) 202 and the keyboard 200 to determine the proximity, and then may compare the measured proximity to a threshold proximity value. The threshold proximity value may be selected by the user of the camera device 100. In an example, the threshold proximity value may be a value within the range from 2 cm to 10 cm. If the measured proximity is less than the threshold proximity value, then the processor(s) 114 may determine the impending use of the keyboard 200. In FIGS. 2 and 3, the measured proximity is less than the threshold proximity value.

On the other hand, if the measured proximity is equal to or greater than the threshold proximity value, then the processor(s) 114 may determine that there is no impending use of the input device. In the scene illustrated in FIG. 4, the user's hand 202 has the same finger orientation as in the scene in FIG. 3, but the hand 202 is positioned a greater distance from the keyboard 200 than in FIG. 3. For example, the hand 202 may be approximately at the height of the top of the display panel 204 of the laptop computer 206 that includes the keyboard 200. In this scene, the processor(s) 114 may determine that the measured proximity between the fingers and the keyboard 200 is greater than the threshold proximity value, and therefore may determine that there is no impending use. For example, the user in FIG. 4 may be reaching to grab the top of the display panel 204 to adjust the tilt angle of the display panel 204. In that case, there is no need to preclude the capture of any image data because there is no impending manual data entry of potentially private information.

In an example, the processor(s) 114 may determine the impending use based on the movement of the user's hand(s) relative to the input device. The processor(s) 114 may track the movement of the user's hands using multiple different frames of the sensor data. In an example, if the processor(s) 114 determine that the hand(s) are moving toward (e.g., approaching) the input device, the processor(s) 114 detect the impending use of the input device and trigger the mitigation.

The movement of the hand(s) can represent a gesture. Users may make specific gestures when about to use specific types of input devices. For example, to use a keyboard, a user may move both hands toward the keys so that the fingers are hovering directly above the keys within a close proximity to the keys. The user may also extend one or more fingers downward in a direction towards the keys. The user may curl their fingers so the fingertips are directed downward. To use a touchscreen or touchpad, the user may extend one or two fingers downward toward the surface, and may lower the hand from above to approach the surface.

The processor(s) 114 may distinguish between different types of hand movements (e.g., gestures) to determine whether or not there is an impending use of the input device. For example, in FIG. 4, the hand 202 may be moving laterally (e.g., side to side) towards the display panel 204. The processor(s) 114 may detect the right-to-left movement of the hand 202 as an indication that the hand 202 is not descending towards the keyboard 200. The processor(s) 114 may also consider the distance of the hand 202 from the keyboard 200 with the movement. As a result, the processor (s) 114 determine that there is no impending use of the keyboard 200 by the hand 202.

In an example, the processor(s) 114 may determine the impending use of the input device based also on an orientation of fingers of the hand depicted in the sensor data. For example, in FIG. 4, a couple fingers of the hand 202 are extended outward, but not downward. For example, the fingers do not appear poised to press keys on the keyboard 200. The processor(s) 114 may interpret this finger orientation as not representative of impending use of the keyboard 200.

In an example, the processor(s) 114 may compare the movement of the hand(s) and/or fingers thereof to stored gestures in a database. The database is referred to as a gesture database. The gesture database may be stored in the memory device 116 of the camera device 100. For example, the processor(s) 114 may determine measured vectors based on the movement of the hand(s) detected in frames of the sensor data. The measured vectors represent the change in position of the hand(s) over time. Each vector can be represented as a direction and speed. The processor(s) 114 may compare the measured movements and/or vectors to stored movement and/or vectors in the gesture database. The stored movements and/or vectors may be representative of different gestures that a person makes during impending use of an input device. The database may categorize the stored movements and/or vectors based on different types of input devices (e.g., keyboards vs touchpads or styluses). In that case, the processor(s) 114 analyzing the sensor data in FIGS. 2 through 4 would access the stored movements and/or vectors associated with keyboards. If the measured vectors match any of the stored vectors beyond a threshold level of similarity, then the processor(s) 114 determine that there is an impending use of the input device. The threshold level of similarity may be 60% match, 70% match, 80% match, 90% match, or the like. If the measured vectors do not match any of the stored vectors beyond the threshold level of similarity, then the processor(s) 114 determine that there is no impending use.

In an example, the impending use determination may be performed by the MLA 124. For example, the MLA 124 may receive the sensor data as an input. In an example, the processor(s) 114 may supply the frames of the sensor data to the MLA 124. The MLA 124 may be trained to detect the hand of the user within the environment and analyze the movement of the hand relative to the input device based on the input sensor data frames. The MLA 124 may output a value indicating a likelihood of the impending use of the input device by the user.

The MLA 124 may be an artificial neural network. The MLA 124 may include multiple layers of artificial neurons (or nodes) connected with each other by functional relationships or edges (e.g., circuits), which model the synapses in a brain. The layers may include an input layer, an output layer, and one or more intermediate layers referred to as hidden layers. The neurons may be processors and/or functions performed by processors. The functional relationships may be rules (e.g., logic rules), mathematical equations, and/or the like. Each neuron receives signals from connected neurons as inputs. The neuron generates an output that is a non-linear function of the sum of its inputs. The strength of the signal at each connection is determined by a weight, which is adjusted during a learning process. The output of each neuron may be transmitted to other neurons in another layer. The final output of the MLA 124 may be used to adjust the weights of the neurons. For example, if the final output is determined to be wrong or inaccurate, then the weights are adjusted to change the relationships between the nodes and reduce the likelihood of yielding the same incorrect output in the future. By this feedback mechanism, the MLA 124 may continue to improve over time.

In the camera device 100, the MLA 124 may receive multiple frames of the sensor data into the input layer of the neural network. The MLA 124 may analyze the input information through the layers of neurons in a forward propagation direction. The MLA 124 may apply rules and/or criteria to the information and reach a conclusion in the form of an output. The output of the MLA 124 may be the value indicating the likelihood of the impending use of the input device by the user. The value may be a numerical value in a range from 0 to 100, 0 to 10, or the like. A value at the higher end of the range may indicate a strong likelihood of an impending use of the input device. A value at the lower end of the range may indicate a low likelihood of an impending use of the input device. The processor(s) 114 may compare the value output by the MLA 124 to one or more threshold values to determine whether or not there is an impending use at that time. For example, if the value is above a first threshold, then the processor(s) 114 may determine that there is an impending use, and may trigger mitigation. On the other hand, if the value is below the first threshold, then the processor(s) 114 may determine that there is no impending use of the input device.

The accuracy of the MLA 124 at predicting impending use may improve over time based on updated information. For example, the processor(s) 114 (optionally with assistance by a user) may determine that the output is incorrect and/or inaccurate because there is too much error. The processor(s) 114 may change the rules, weights, and/or criteria in the neurons and synaptic circuits. For example, the processor(s) 114 may alter the functions performed by some neurons, the synaptic circuit connections between the neurons (e.g., which neurons communicate with which neurons in the neural network), the weights of the signals, and/or the like. Then, the processor(s) 114 may perform the operation again using the adjusted MLA 124 to reach an updated output. The updated output may have less error, and therefore be more correct, than the initial output. The processor(s) 114 may change the synaptic circuits (e.g., the relationships between the neurons) based on feedback (e.g., error, back propagation, etc.) received from earlier machine learning analysis to reach a more accurate result.

In response to determining that there is an impending use of the input device, the processor(s) 114 initiate a mitigation protocol. The mitigation protocol includes generating an image data stream that includes altered image content within an area of interest (AOI) of a field of the image data stream. The AOI encompasses the input device, and thereby shields or conceals the actual manipulation of the input device by the user that occurs in real life. The altered image content is not an accurate representation of the hand manipulating the input device in the environment. As a result, the image data stream that is generated lacks capture of data entry by the user into the input device.

FIG. 5 shows an incomplete frame 300 of the image data stream depicting the scene shown in FIG. 2. The frame 300 represents an intermediate stage of the image generation process by the processor(s) 114. The frame 300 includes unaltered (e.g., accurate) image content 302 within a field 304 or border of the frame 300. The frame 300 also includes an AOI 306. The AOI 306 encompasses the input device, which in this example is the keyboard 200 (shown in FIG. 2). FIG. 5 is provided to assist with explaining the operations of the camera device 100. The frame 300 as shown in FIG. 5 may not actually be produced during the actual operation. The frame that is actually generated and output by the processor(s) 114 is a finished frame that includes altered image content within the AOI 306. The processor(s) 114 may generate the image data stream as a series of many individual frames over time that collectively represent a video.

The processor(s) 114 may use the sensor data to generate the unaltered or accurate image data 302 for the remainder of the field 304 outside of the AOI 306. The image data 302 is referred to as accurate because it accurately represents the scene in the real world environment that is being imaged. The accurate image data 302 is in a form that is visible to humans. The processor(s) 114 may use conventional processing techniques to transform the sensor data (e.g., raw image data) to the accurate image data 302. For example, the processor(s) 114 may perform lighting balance and/or color correction on the sensor data to generate the accurate image data 302.

When generating the image data stream, the processor(s) 114 include altered image data in the AOI 306. The processor(s) 114 may use different types of altered image data depending on user-selected settings, usage applications, and/or the like. FIG. 6 shows a still image 310 that represents one example of altered image data that can be incorporated into the image data stream that is generated. The still image 310 in FIG. 6 depicts that user's actual fingers 312 and the actual keyboard 200. However, the still image 310 is a single frame in time. The processor(s) 114 may generate the image data stream to include the still image 310 in the AOI 306 in multiple different consecutive frames over time while the user is using the keyboard in real life. Therefore, rather than capturing the actual keystrokes entered by the user, the generated image data stream merely shows the still image 310. An observer of the image data stream is not able to discern any keystrokes from the single image 310 that is shown in multiple image frames in the stream. The video stream shows the fingers static over time, rather than typing on the keyboard 200. In another example, the still image that is used in the AOI 306 may depict generic or stock hands of a generic user, rather than the actual hands of the actual user.

In another example, the still image may not show any hands. For example, the still image may simply depict the keyboard 200, and may omit the user's hands to avoid capturing the keystrokes.

FIG. 7 shows a blur effect 320 that represents a second example of altered image data that can be incorporated into the generated image data stream. For example, upon determining the impending use, the processor(s) 114 may blur the AOI 306 shown in FIG. 5. The resulting image frame in the stream will include the accurate image data 302 as shown in FIG. 5 with the blur effect 320 within the AOI 306. The blur effect 320 conceals the keystrokes of the user on the keyboard 200. Various different types of blur effects 320 may be used to conceal the manual data entry.

In another example, the processor(s) 114 may generate, as the altered image content in the AOI 306, an inaccurate reconstruction of the movement of the user's hand relative to the input device. For example, the processor(s) 114 may input the sensor data that corresponds to the AOI 306 into a function that modifies the positioning of the hands (or fingers thereof) relative to the input device so that the manual data entry depicted in the generated image data stream is an inaccurate representation of the actual manual data entry. For example, the inaccurate reconstruction may be a video that shows user positioning and/or movement relative to the input device, which differ from the actual positioning and/or movement of the user relative to the input device in the environment. As an example, the processor(s) 114 may shuffle the sensor data that corresponds to the AOI 306 over time so that the image data that is generated is out of sequence. The inaccurate reconstruction may be generated to preclude the risk of reverse engineering by an observer, thereby preserving the confidentiality of the actual keystrokes of the user.

In an example, the processor(s) 114 may only generate the image data stream to include altered image content during periods of time associated with the user using the input device. For example, if the processor(s) 114 determine, based on the sensor data analysis described above, that there is no impending use of the input device within the field of view, then the processor(s) 114 generate the image data stream based on the sensor data so that the image data stream lacks the altered image content. This may be referred to as a normal mode. For example, referring to FIG. 5, if the processor(s) determined that the user was not about to use the keyboard 200, then the frame 300 would be generated to omit the altered image content. The processor(s) would use the sensor data to generate accurate image data within the area indicated by the AOI 306.

Furthermore, the mitigation protocol may be designed to have a limited time period. The processor(s) 114 may continue to periodically analyze frames of sensor data even after triggering the mitigation protocol to incorporate the altered image content as shown in FIGS. 6 and 7. Once the processor(s) 114 determine that the user is no longer using the input device (e.g., is not longer performing manual data entry), the processor(s) 114 may revert to the normal mode in which the entirety of the frame is filled with accurate image data based on the sensor data from the image sensor 106.

After generating the image data stream, the processor(s) 114 may store the image data stream and/or communicate the image data stream to an external (e.g., remote) computing device. For example, the processor(s) 114 may store the image data stream on the memory 116 or on another data storage device within or connected to the camera device 100. The image data stream may be stored for backup or for retaining for a period of time in the camera device 100 until a user is ready to extract the image data stream. In another example, the processor(s) 114 may communicate the image data stream to an external computing device. For example, the processor(s) 114 may control the communication device 108 of the camera device 100 to transmit the image data stream via a network to a server or the like. In an example application, the communication device 108 may transmit the image data stream in near real time via the network for distribution of the image data stream to multiple external personal computer devices of participants of a videoconference. The image data stream includes altered image content to preclude capture of any manual data entry provided by a presenter of the videoconference.

FIG. 8 is a flow chart 800 of a method for precluding capture of manual data entry in image data, according to an embodiment. The method may be performed entirely or in part by the controller 102 (e.g., the one or more processors 114) of the camera device 100. The method optionally may include at least one additional step than shown in FIG. 8, at least one fewer step than shown in FIG. 8, and/or at least one different step than shown in FIG. 8.

At step 802, sensor data generated by an image sensor 106 is received. The sensor data represents an environment from which light propagates through a lens 104 of the camera device 100 and impinges on the image sensor 106. At step 804, object detection is performed on the sensor data to detect an input device within the environment. The input device is designed to be manually manipulated to provide an input signal. The input device may be a keyboard, a keypad, a touchscreen, a touchpad, a stylus, and/or the like. At step 806, the sensor data is analyzed to detect at least one hand of a user within the environment.

At step 808, an impending use of the input device by the user is determined. The impending use determination may be based on a proximity of the hand or hands to the input device and/or movement of the hand(s). At step 810, in response to determining the impending use, an image data stream is generated that includes altered image content within an area of interest (AOI) of a field of the image data stream. The AOI encompasses the input device. The altered image content is not an accurate representation of the hand(s) of the user manipulating the input device in the environment. As a result, the image data stream lacks capture of data entry by the user into the input device. In response to determining that there is no impending use, the method may include generating the image data stream to lack the altered image content within the AOI.

At step 812, the image data stream that is generated is (i) stored on the memory 116 of the camera device 100 and/or (ii) communicated to at least one external computing device.

CLOSING STATEMENTS

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), complex instruction set computer (CISC), application specific integrated circuits (ASICs), field-programmable gate arrays (FPGAs), logic circuits, and any other circuit or processor capable of executing the functions described herein. Additionally, or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

In one embodiment, the computer management system may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, SVMs, Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Further, in the following claims, the phrases "at least A or B", "A and/or B", and "one or more of A and B" (where "A" and "B" represent claim elements), are used to encompass i) A, ii) B or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A camera device comprising:
an image sensor configured to capture light propagating through a lens from an environment outside of the camera device and generate sensor data representing the environment;
a memory configured to store program instructions; and
one or more processors operably connected to the memory, wherein the program instructions are executable by the one or more processors to:
perform object detection on the sensor data to detect an input device within the environment that is configured to be manually manipulated to provide an input signal;
analyze the sensor data to detect at least one hand of a user within the environment;
determine an impending use of the input device by the user based on at least one of a proximity of the hand to the input device or movement of the hand; and
responsive to determining the impending use, generate an image data stream that includes altered image content within an area of interest (AOI) of a field of the image data stream, wherein the AOI encompasses the input device, wherein the altered image content is not an accurate representation of the hand manipulating the input device in the environment, so the image data stream lacks capture of data entry by the user into the input device.

2. The camera device of claim 1, wherein the program instructions are executable by the one or more processors to at least one of: (i) store the image data stream on the memory or (ii) communicate the image data stream to an external computing device.

3. The camera device of claim 1, wherein the one or more processors are configured to directly receive the sensor data from the image sensor.

4. The camera device of claim 1, wherein the program instructions are executable by the one or more processors to generate the image data stream to include the altered image content and accurate image content within a remainder of the field of the image data stream, wherein the one or more processors are configured to generate the accurate image content by performing at least one of lighting balance or color correction on the sensor data.

5. The camera device of claim 1, wherein the program instructions are executable by the one or more processors to determine one or more measured vectors based on the movement of the hand, the one or more processors configured to determine the impending use of the input device by the user by comparing the one or more measured vectors to stored vectors in a gesture database.

6. The camera device of claim 1, wherein the program instructions are executable by the one or more processors to perform the object detection on the sensor data to detect at least one of a keyboard, a keypad, a touch screen, a touch pad, or a stylus.

7. The camera device of claim 1, wherein the program instructions are executable by the one or more processors to receive the sensor data as a sequence of sensor data frames generated by the image sensor over time, and the program instructions are executable by the one or more processors to analyze multiple sensor data frames in the sequence to determine the impending use of the input device by the user based on at least one of the proximity of the hand to the input device or the movement of the hand.

8. The camera device of claim 1, wherein the program instructions are executable by the one or more processors to determine the impending use of the input device based on both the proximity of the hand to the input device and the movement of the hand.

9. The camera device of claim 1, wherein the program instructions are executable by the one or more processors to determine the impending use of the input device based also on an orientation of fingers of the hand depicted in the sensor data.

10. The camera device of claim 1, wherein the one or more processors include an image signal processor (ISP).

11. The camera device of claim 1, wherein the one or more processors include a machine learning (ML) algorithm that receives the sensor data as an input, wherein the ML algorithm is trained to detect the hand of the user within the environment and analyze the movement of the hand relative to the input device based on the input, wherein the ML algorithm is configured to output a value indicating a likelihood of the impending use of the input device by the user.

12. The camera device of claim 1, further comprising a housing that surrounds and contains the image sensor, the memory, and the one or more processors, wherein the lens is mounted to the housing.

13. The camera device of claim 1, wherein the program instructions are executable by the one or more processors to generate the image data stream by blurring the AOI as the altered image content.

14. The camera device of claim 1, wherein the program instructions are executable by the one or more processors to generate the image data stream by incorporating a still image in the AOI as the altered image content.

15. The camera device of claim 14, wherein the still image depicts at least one of: (i) the hand of the user, (ii) a stock hand of a generic user, or (iii) the input device.

16. The camera device of claim 1, wherein the program instructions are executable by the one or more processors to generate the image data stream by generating, as the altered image content in the AOI, an inaccurate reconstruction of the movement of the hand relative to the input device, wherein a position of one or more fingers of the hand relative to the input device in the inaccurate reconstruction differs from an actual position of the one or more fingers relative to the input device in the environment.

17. The camera device of claim 1, wherein, responsive to determining that use of the input device by the user is not impending, the program instructions are executable by the one or more processors to generate the image data stream based on the sensor data so that the image data stream lacks the altered image content.

18. A method comprising:
   receiving sensor data generated by an image sensor of a camera device and representing an environment outside of the camera device, the image sensor configured to generate the sensor data based on capturing light propagating through a lens of the camera device from the environment;
   performing object detection on the sensor data to detect an input device within the environment that is configured to be manually manipulated to provide an input signal;
   analyzing the sensor data to detect at least one hand of a user within the environment;
   determining an impending use of the input device by the user based on at least one of a proximity of the hand to the input device or movement of the hand; and
   responsive to determining the impending use, generating an image data stream that includes altered image content within an area of interest (AOI) of a field of the image data stream, wherein the AOI encompasses the input device, wherein the altered image content is not an accurate representation of the hand relative to the input device in the environment, so the image data stream lacks capture of data entry by the user into the input device.

19. The method of claim 18, further comprising at least one of: (i) storing the image data stream on a memory of the camera device or (ii) communicating the image data stream to an external computing device.

20. A computer program product comprising a non-transitory computer readable storage medium, the non-transitory computer readable storage medium comprising computer executable code configured to be executed by one or more processors to:
   receive sensor data generated by an image sensor of a camera device and representing an environment outside of the camera device, the image sensor configured to generate the sensor data based on capturing light propagating through a lens of the camera device from the environment;

perform object detection on the sensor data to detect an input device within the environment that is configured to be manually manipulated to provide an input signal;

analyze the sensor data to detect at least one hand of a user within the environment;

determine an impending use of the input device by the user based on at least one of a proximity of the hand to the input device or movement of the hand; and responsive to determining the impending use, generate an image data stream that includes altered image content within an area of interest (AOI) of a field of the image data stream, wherein the AOI encompasses the input device, wherein the altered image content is not an accurate representation of the hand relative to the input device in the environment, so the image data stream lacks capture of data entry by the user into the input device.

\* \* \* \* \*